United States Patent

Eisenmann et al.

[11] Patent Number: 5,917,066
[45] Date of Patent: Jun. 29, 1999

[54] INLINE ULTRA-HIGH EFFICIENCY FILTER

[75] Inventors: Mark R. Eisenmann, Burlington; Richard D. Balazy, Terryville, both of Conn.

[73] Assignee: Mott Metallurgical Corporation, Farmington, Conn.

[21] Appl. No.: 08/895,605

[22] Filed: Jul. 16, 1997

[51] Int. Cl.⁶ .................................................. B01D 46/24
[52] U.S. Cl. ........................... 55/502; 55/523; 210/510.1
[58] Field of Search ....................... 55/522, 523, DIG. 5, 55/490, 495, 502; 210/510.1

[56] References Cited

U.S. PATENT DOCUMENTS

| | | | |
|---|---|---|---|
| 3,527,027 | 9/1970 | Knight et al. | 55/523 X |
| 3,933,652 | 1/1976 | Weichselbaum et al. | 210/510.1 X |
| 3,976,529 | 8/1976 | Weichselbaum | 210/210.1 X |
| 4,500,328 | 2/1985 | Brassell et al. | 55/523 X |
| 4,911,837 | 3/1990 | Allington et al. | 210/510.1 X |
| 4,966,696 | 10/1990 | Allington et al. | 210/510.1 X |
| 4,968,467 | 11/1990 | Zievers | 55/DIG. 5 |
| 5,071,457 | 12/1991 | Schmidt, Jr. et al. | 55/DIG. 5 |
| 5,114,447 | 5/1992 | Davis | 55/523 X |
| 5,369,063 | 11/1994 | Gee et al. | 210/510.1 X |
| 5,415,772 | 5/1995 | Garcera et al. | 55/523 X |
| 5,487,771 | 1/1996 | Zeller | 55/523 |
| 5,490,868 | 2/1996 | Whitlock et al. | 55/503 |
| 5,507,847 | 4/1996 | George et al. | 55/522 X |
| 5,564,755 | 10/1996 | Ackermann et al. | 55/523 X |

FOREIGN PATENT DOCUMENTS

| | | | |
|---|---|---|---|
| 0484839 | 11/1917 | France | 55/523 |
| 3024324 | 1/1982 | Germany | 55/523 |
| 06-304425 | 11/1994 | Japan | 55/523 |

OTHER PUBLICATIONS

Pall Sales Brochure, "Mini–Ultramet–L Gaskleen 1000 Series Assembly", p 104.
Pall Sales Brochure, "Gasket–Sert Filter", p. 102
Millipore Sales Catalogue, "Unigard Gas Filters", p. 49.
Mott GasShield All Nickel GasketFilter (DB 6814).
Nippon Seisen Co., Ltd. NASclean–Ultra—clean; ultra high–precision filter, Sales Brochure.
Nippon Seisen Co., Ltd. NASclean Filter Technical Data, pp. 2–25.

Primary Examiner—Robert Spitzer
Attorney, Agent, or Firm—Hale and Dorr LLP

[57] ABSTRACT

An inline ultra-high efficiency filter comprising a housing having a chamber extending the length thereof, an inlet and an outlet providing flow passages into and from the chamber. Seated in the chamber is a porous sintered metal filter element having a tubular body open at its end adjacent the inlet and an end wall at its other end adjacent the outlet, and the filter element provides an internal flow passage extending therein from the inlet to the end wall. A sealing weldment provides an air tight seal between the periphery of the filter element and the housing adjacent the inlet. The filter element is spaced from the wall of the chamber to provide a plenum space thereabout, and a gas stream entering the inlet end of the filter passes into the internal flow passage of the filter element and outwardly of the body of the filter element into the plenum space and thence outwardly of the outlet end of the filter. This filter achieves a 9LRV efficiency determined for the most penetrating particle size at the rated flow.

20 Claims, 5 Drawing Sheets

INLINE ULTRA-HIGH EFFICIENCY FILTER

BACKGROUND OF THE INVENTION

The present invention relates to filters and, more particularly, to inline filters for removing extremely small particles from a stream of gas passing therethrough.

As is well known, ultra-high efficiency porous sintered metal filters are widely utilized in the electronic and other industries wherein an extremely clean environment is necessary in order to avoid contamination of sensitive products. For example in the electronics industry, inline filters are frequently used to treat the process gases to avoid introduction of any particulate matter in the manufacturing process of semiconductors which would contaminate the electronic products.

The electronic industry has recognized the advantages in use of sintered metal filters to achieve highly efficient removal of small particles. Illustrative of structures for this purpose are those indicated in Davis U.S. Pat. No. 5,114,447 granted May 19, 1992 and Zeller U.S. Pat. No. 5,487,771 granted Jan. 31, 1996.

Although the filters shown in these patents are effective to remove small particles in the gas stream, the relatively large internal volume of the filter chamber relative to the space occupied by the filter element provides dead space for gas entrapment and moisture buildup. Moreover, the special housing designs to receive such filters and provide sufficient filter area often require special closures and multiple welds, and these must be helium tested or pressure tested. Moreover, multipart housings increase the costs and time of manufacture.

The electronics industry is desirous of inline filters which may be readily installed and quickly purged and which will achieve a high efficiency rate of removal of 99.9999999% determined at the most penetrating particle size in the vicinity of 0.1 micrometer. The test methodology for evaluating 9 log reduction values (9LRV) of particles is described in Rubow, K. L., D. S. Prause and M. R. Eisenmann, "*A Low Pressure Drop Sintered Metal Filter for Ultra-High Purity Gas Systems*", Proceedings of the 43rd Annual Technical Meeting of the Institute of Environmental Sciences, Los Angeles, Calif. May 6–8, 1997, and Rubow, K. L. and C. B. Davis, "*Particle Penetration Characteristics of Porous Metal Media for High Purity Gas Filtration*", Proceedings of the 37th Annual Technical Meeting of the Institute of Environmental Sciences, PP834–840, 1991.

The industry also wishes to achieve relatively high flow rates with relatively low pressure differential losses across the filter.

It is an object of the present invention to provide a novel inline filter utilizing a porous sintered metal filter element which provides extremely high efficiency in minute particle removal and exhibits low pressure differential losses.

It is also an object to provide such a filter which is readily fabricated and easily assembled in a gas line.

Another object is to provide such a filter which has relatively little internal volume not occupied by the filter element and which utilizes straight through flow to optimize operation.

A further object is to provide such a filter which is free from welds downstream of the filter media to eliminate leaks, minimize corrosion, and reduce failures.

SUMMARY OF THE INVENTION

It has now been found that the foregoing and related objects may be readily attained in an inline ultra-high efficiency filter comprising a housing having (i) a chamber extending the length thereof, (ii) an inlet at one end providing a flow passage into the chamber, and (iii) an outlet at the other end providing a flow passage from the chamber. In the chamber is a porous sintered metal filter element which has (i) a tubular body open at its end adjacent the inlet end of the housing and (ii) an end wall at its other end adjacent the outlet end of the housing. This filter element provides an internal flow passage extending therein from the inlet to the end wall. Sealing means provides an air tight seal between the periphery of the filter element and the housing adjacent the inlet, the filter is spaced from the wall of the chamber to provide a plenum space thereabout. A gas stream entering the inlet end of the filter passes into the internal flow passage of the filter element and outwardly of the body of the filter element into the plenum space and thence outwardly of the outlet end of the filter.

Preferably, the end wall of the filter element is integrally molded with the tubular body. Alternatively, the end wall of the filter element is a separate plug secured to the tubular body.

The passage of the housing adjacent the inlet has a shoulder of lesser diameter than the remainder of the chamber. The filter element is of uniform diameter along its length and its inlet end portion seats snugly on the shoulder of the housing. The inlet end of the filter element is adjacent the inlet of the housing, and the sealing means is a weldment extending about the abutting surfaces of the element and the shoulder.

Desirably, the filter element is of a cross section and length to occupy at least 75 percent of the volume of the chamber.

DETAILED DESCRIPTION OF THE PREFERRED EMBODIMENT

Figure 1:
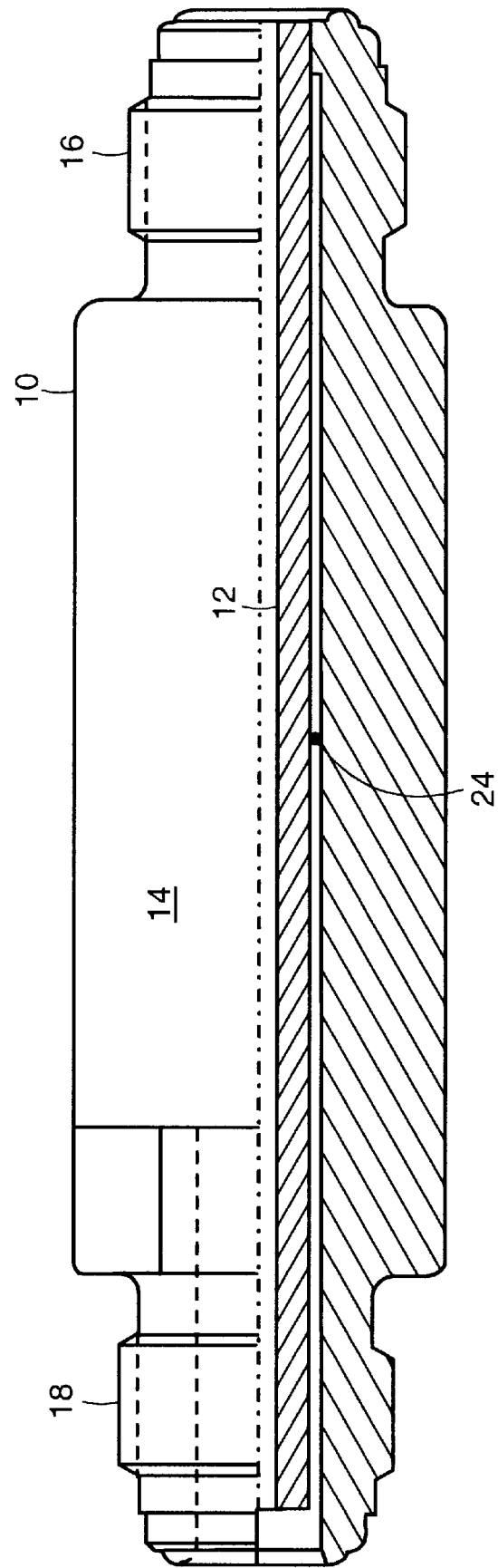
FIG. 1 is a side elevational view in partial section of an inline filter embodying the present invention.
Figures 2, 3:
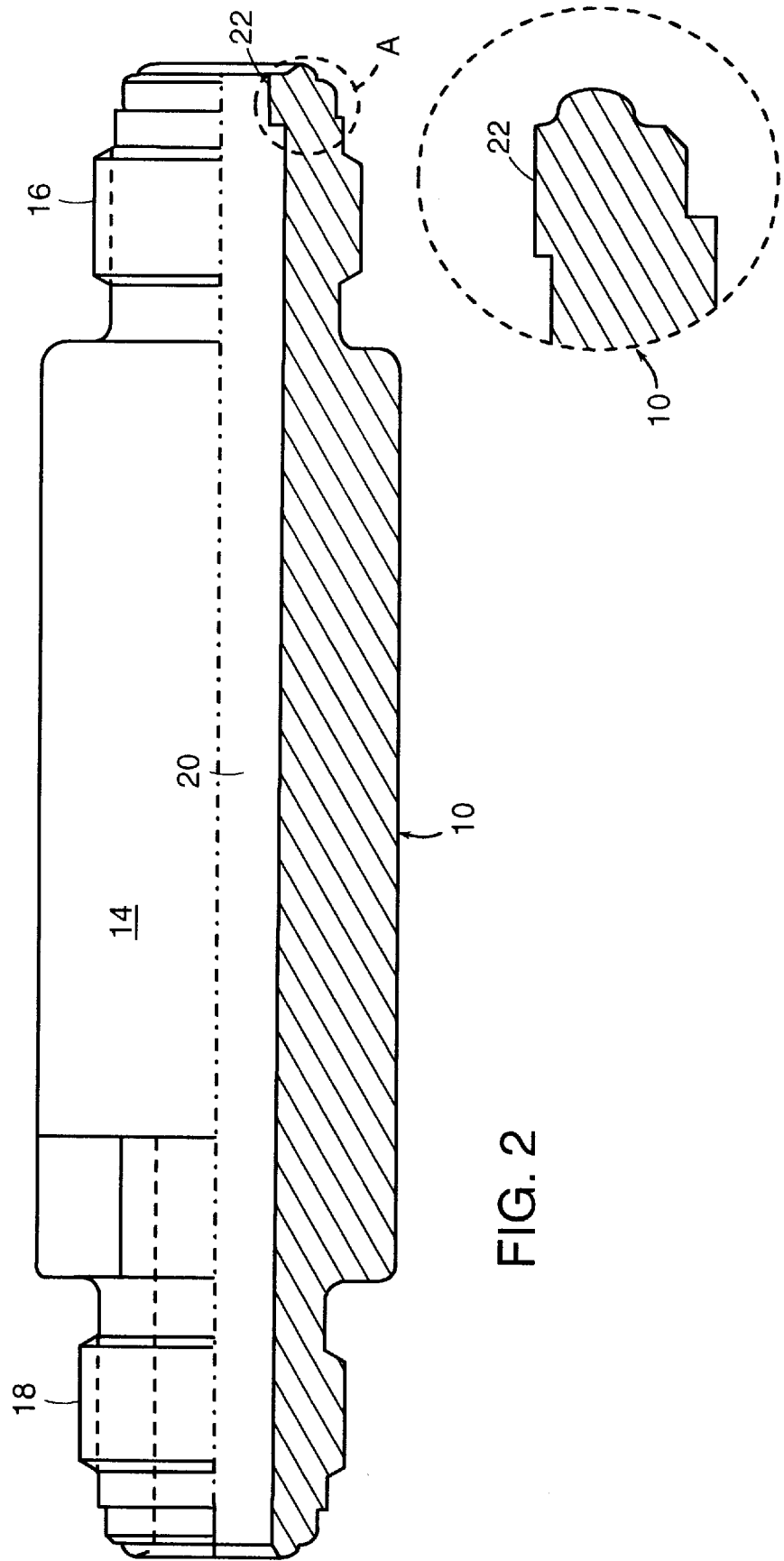
FIG. 2 is a similar view with the filter element removed.
FIG. 3 is an enlarged view of the inlet portion designated A in FIG. 2.

The inline porous metal filter of the present invention includes a housing generally designated by the numeral 10 which contains a cup-shaped porous metal filter element generally designated by the numeral 12. The filter housing has a body portion 14, inlet end portion 16 and an outlet end portion 18.

As seen in FIGS. 1–4, the housing has a passage or bore 20 which extends therethrough and provides a chamber in which the filter element 12 is seated. Adjacent the outer end of the inlet end portion 16, the bore 20 has a reduced diameter portion 22 in which is snugly seated the end portion of the filter element 12, and a plenum space 24 is provided between the filter element 12 and the bore 20 over the remainder of the length of the filter element 12.

Figure 4:
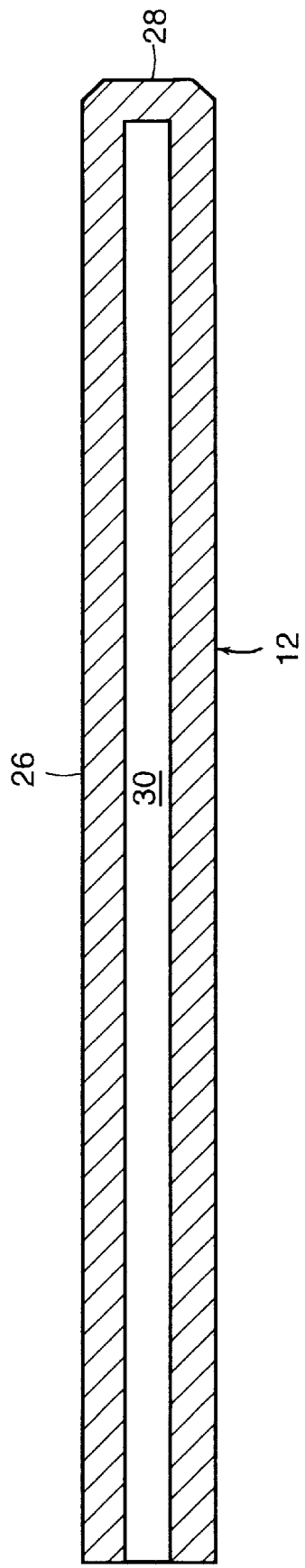
FIG. 4 is an enlarged longitudinal cross section of the filter element.

As best seen in FIG. 4, the filter element 12 has an elongated tubular body portion 26 of substantially uniform wall thickness and an end wall portion 28 providing a closure for the cavity 30 therewithin in the outlet end portion 18. Desirably, the end wall portion 28 is bevelled to reduce the wall thickness.

Figure 6:
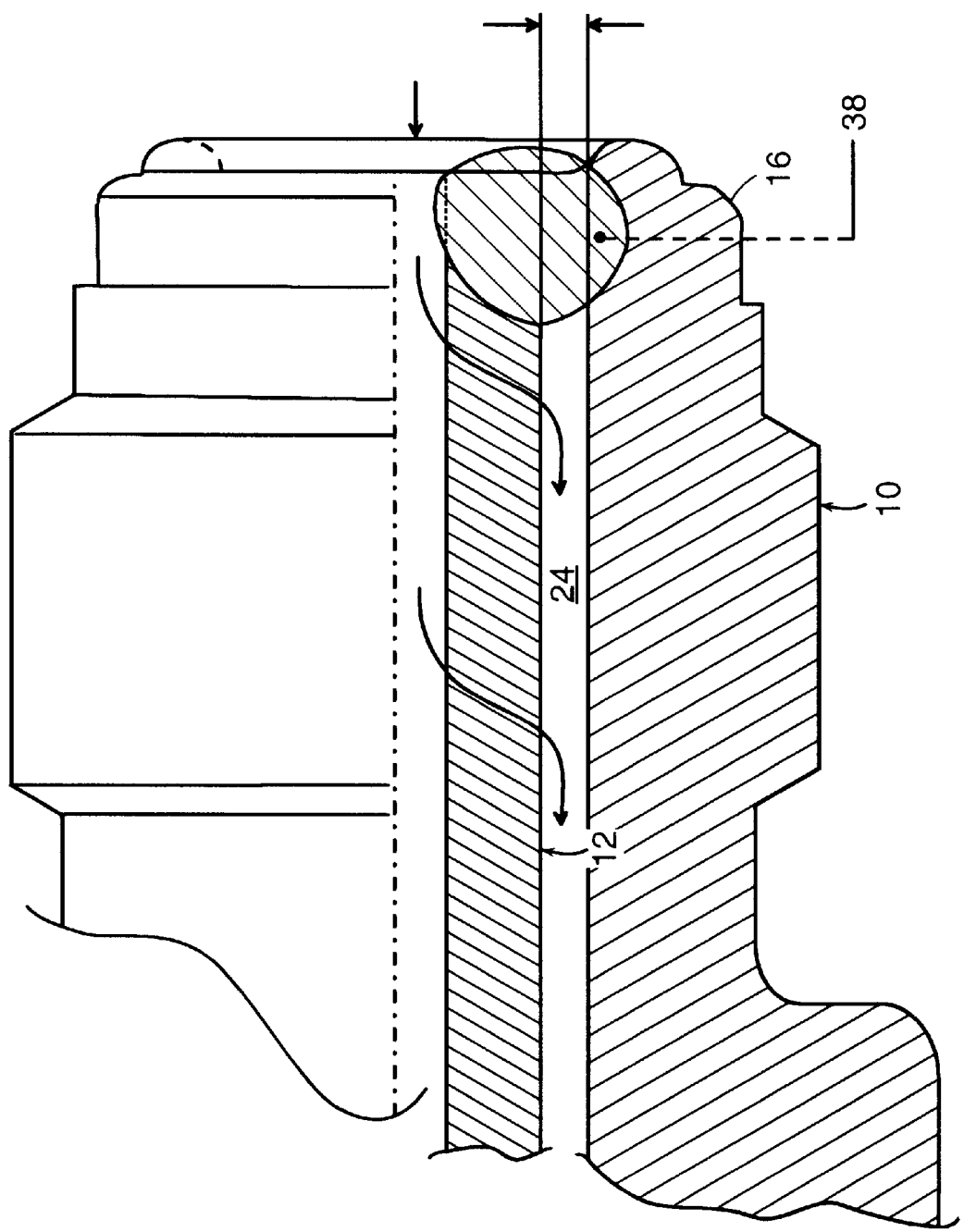
FIG. 6 is a partially diagrammatic sectional view of the filter showing flow path of gas adjacent the inlet end of the filter and the weldment mounting and sealing the filter element to the inlet end portion of the housing.

As seen in FIG. 6, the gas entering the filter 12 through the inlet end portion 16 passes into the cavity 30 of the filter element 12 and passes outwardly through the porous walls of the body portion 26 and end wall portion 28 into the plenum space 24. From the plenum space 24, the gas exits the filter through the outlet end portion 18.

Figure 5:
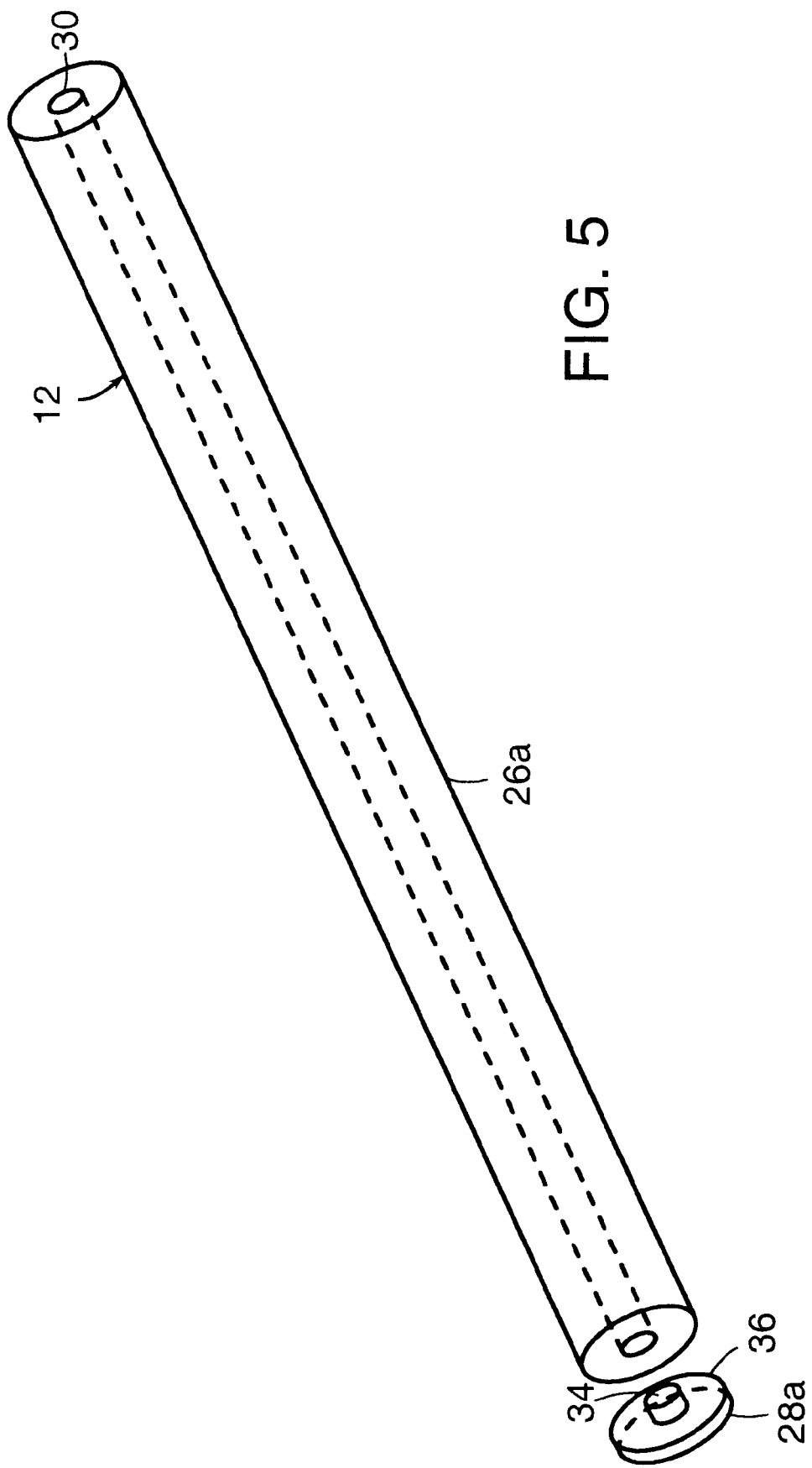
FIG. 5 is an enlarged exploded longitudinal cross section of an alternate embodiment of the filter element.

In the embodiment of FIG. 4, the body portion 26 and end wall portion 28 of the filter element 12 are integrally formed. In the embodiment of FIG. 5, the body portion 26a is formed as a cylinder and the end wall portion 28a is provided by a plug with a body portion 34 which seats in the cavity 30 and a collar 36 which abuts the end thereof of the cylinder.

To secure the filter element 12 in coaxial alignment and sealed relationship with the inlet end portion 16 of the housing 10, a weldment 38 is formed about the abutting surfaces at the inlet end, as diagrammatically illustrated in FIG. 6.

As will be readily appreciated, the housing for the filter may be readily fabricated from bar or rod stock which is machined to provide all of the external contours and a straight through bore passage. As illustrated, the passage is of uniform diameter except for a reduced end portion at the inlet designed to provide the shoulder to which the filter element is welded. Various metals may be employed; Type 316 stainless has been found highly useful for this particular application. The housing can be electropolished following machining to a smooth finish to minimize the potential for corrosion.

The filter itself is a sintered metal cup-shaped structure which is preferably integrally formed as shown in the first embodiment although it can be assembled from a cylindrical element and an end cap or plug as shown in the second embodiment. The filter media is 20–50% dense (50–80% porous) and is composed of a corrosion resistant metal. The metal powder for the filter can be any suitable powder having a particle size which is generally less than 20 micrometers and preferably less than 10 micrometers. Exemplary of suitable metals are nickel, Type 316 stainless steel, and a nickel/chromium/molybdenum alloy sold by Haynes International under the trademark HASTELLOY. In the case of nickel, INCO Type 255 filamentary powder having a particle size of 2–4 micrometers has proven highly effective.

By providing a cup-shaped filter as illustrated in the attached drawings, it can be seen that the filter occupies substantially the entire length of the passage through the housing and its diameter is only slightly smaller than the diameter of the through flow passage so that only a small plenum passage is provided about the filter (e.g., 0.225 in a 0.250 inch passage). This reduces the amount of dead space within the body of the filter housing and minimizes the time needed to purge and dry the filter after installation and then during changeouts. Moreover, by providing such a large surface area for filtration, highly efficient flow of the gas through the filter can be attained and back pressure problems can be reduced.

These ultra-high efficiency inline filters are 99.9999999% efficient at a specified flow rate and pressure drop which is dependent on material density and filter surface area available. The pressure differential across the inline filter is typically less than 8 psi when exiting to atmospheric pressure at the rated flow between 0.1 and 100 SLPM (standard liters per minute) nitrogen dependent on filter area of the design. In this example, a filter with 2.3 square inches of outer diameter surface area has a 9 LRV filter rating at 15 SLPM flow of nitrogen with a 7 psi pressure loss when exiting to atmosphere. The filter has even greater efficiency at flow rates lower than the rated flow. The extended area of a cup shape filter and the low density filter media result in relatively low pressure differential losses in the gas delivery system which typically operates in the 30–90 psi range. Low pressure differential losses are required for practical operation of the inline filter for high purity gas filtration applications.

Moreover, the filter element can be easily secured and sealed within the passage of the filter housing by welding it to a shoulder formed at the inlet end. Any suitable welding technique may be employed including electron beam and laser.

Additionally, the elimination of any and all welds downstream of the filter media precludes leaks and/or failures of the housing integrity. Furthermore the elimination of the welds in the housing eliminates sources or sites for corrosion typically associated with welds and weld effected areas adjacent to the weld itself.

Thus, it can be seen that the novel inline filter of the present invention is one which is easy to fabricate and highly efficient because of the large filtration surface area which it provides. Moreover, by reducing dead space within the filter housing, the time required for purging and drying is substantially reduced.

Having thus described the invention, what is claimed is:

1. An inline ultra-high efficiency filter comprising:
   (a) a housing having (i) a chamber extending the length thereof, (ii) an inlet at one end providing a flow passage into said chamber, and (iii) an outlet at the other end providing an flow passage from said chamber;
   (b) a porous sintered metal filter element in said chamber having (i) a tubular body open at its end adjacent said inlet end of said housing said open end being in said inlet and (ii) an end wall at its other end adjacent said outlet end of said housing, said filter element providing an internal flow passage extending herein from said inlet to said end wall; and
   (c) a weldment to provide an air tight seal between the periphery of said filter element and said housing adjacent said inlet, said filter element being spaced from the wall of said chamber to provide a plenum space thereabout, whereby a gas stream entering said inlet end of said filter passes into said internal flow passage of said filter element and outwardly of said body of said filter element into said plenum space and thence outwardly of said outlet end of said filter.

2. The inline ultra-high efficiency filter in accordance with claim 1 wherein said end wall of said filter element is integrally molded with said tubular body.

3. The inline ultra-high efficiency filter in accordance with claim 1 wherein said end wall of said filter element is a separate plug secured to said tubular body.

4. The inline ultra-high efficiency filter in accordance with claim 1 wherein said passage of said housing adjacent said inlet has a shoulder of lesser diameter than the remainder of said chamber.

5. The inline ultra-high efficiency filter in accordance with claim 4 wherein said filter element is of uniform diameter along its length and its inlet end portion seats snugly on said shoulder of said housing.

6. The inline ultra-high efficiency filter in accordance with claim 5 wherein the inlet end of said filter element is adjacent said inlet of said housing.

7. The inline ultra-high efficiency filter in accordance with claim 6 wherein said weldment extends about the abutting surfaces of said filter element and said shoulder.

8. The inline ultra-high efficiency filter in accordance with claim 1 wherein said filter element is of a cross section and length to occupy at least 75 percent of the volume of said chamber.

9. The inline ultra-high efficiency filter in accordance with claim 1 wherein said filter element has an efficiency of 99.9999999% determined for the most penetrating particle size at the rated flow.

10. The filter of claim 1 wherein the filter element is held to the housing solely by the weldment adjacent the inlet.

11. The filter of claim 1 wherein the housing is a single piece housing.

12. The filter of claim 1 wherein the filter element comprised of a media of about 20% to 50% density and 50% to 80% porosity.

13. The filter of claim 1 wherein the filter element comprises metal powder having a particle size of less then about 20 micrometers.

14. The filter of claim 1 wherein the filter element occupies substantially the length of the housing.

15. An inline ultra-high efficiency filter comprising:
   (a) a housing having (i) a chamber extending the inlet length thereof, (ii) an inlet at one end providing a flow passage into said chamber and an outlet the other end providing an flow passage from said chamber, said passage of said housing adjacent said inlet having a shoulder of lesser diameter than the remainder of said chamber;
   (b) a porous sintered metal filter element in said chamber having (i) a tubular body open at its end adjacent the inlet end of said housing said open end being in said inlet and (ii) an end wall at its other end adjacent the outlet end of said housing, said filter element providing an internal flow passage extending therein from said inlet to said wall, said filter element being of uniform diameter along its length and having its inlet end portion seated snugly on said shoulder of said housing; and
   (c) a weldment to provide an air tight seal between the of said filter element and said housing adjacent said inlet, said filter element being spaced from the wall of said chamber to provide a plenum space thereabout, said filter element being of a cross section and length to occupy at least 75 percent of the volume of said chamber whereby a gas stream entering said inlet end of said filter passes into said internal flow passage of said filter element and outwardly of the body of said filter element into said plenum space and thence outwardly of said outlet end of said filter.

16. The inline ultra-high efficiency filter in accordance with claim 15 wherein the inlet end of said filter element is adjacent said inlet of said housing.

17. The inline ultra-high efficiency filter in accordance with claim 15, wherein said weldment extends about the abutting surfaces of said filter element and said shoulder.

18. The inline ultra-high efficiency filter in accordance with claim 15 wherein said end wall of said filter element is integrally molded with said tubular body.

19. The inline ultra-high efficiency filter in accordance with claim 15 wherein said end wall of said filter element is a separate plug secured to said tubular body.

20. The inline ultra-high efficiency filter in accordance with claim 15 wherein said filter element has an efficiency of 99.9999999% determined for the most penetrating particle size at the rated flow.

* * * * *